Aug. 19, 1969 W. C. WETZEL 3,462,760
ELECTRIC HORN WITH UNGROUNDED BASE AND INSULATED MOUNTING BRACKET
Filed July 10, 1967
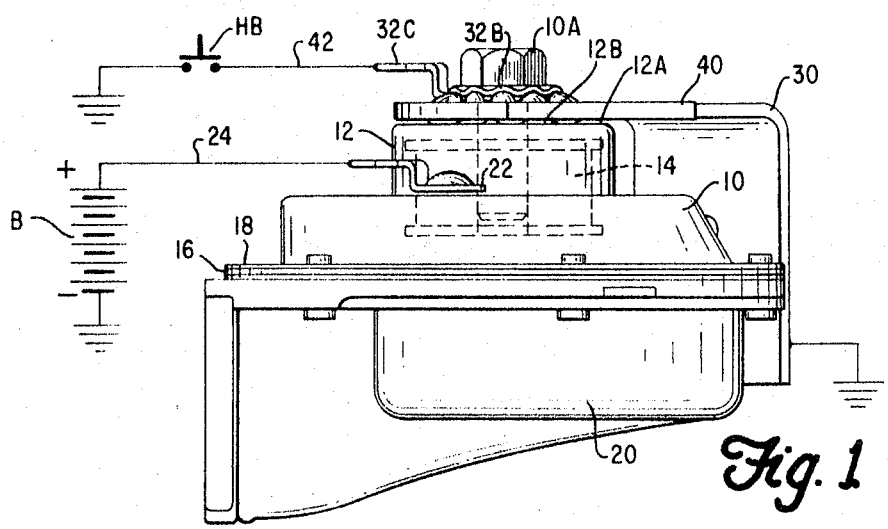
Fig. 1
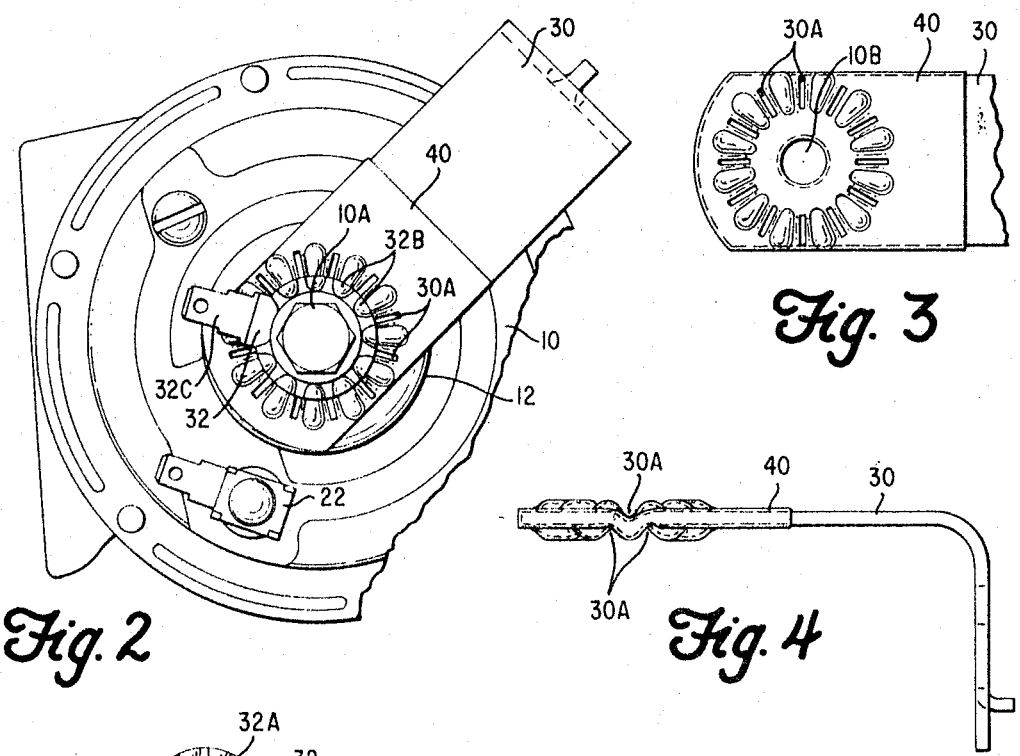
Fig. 2
Fig. 3
Fig. 4
Fig. 5
INVENTOR.
WILLIAM C. WETZEL
BY
D. Henry Stoltenberg
ATTORNEY United States Patent Office 3,462,760
Patented Aug. 19, 1969

3,462,760
ELECTRIC HORN WITH UNGROUNDED BASE AND INSULATED MOUNTING BRACKET
William C. Wetzel, Bay City, Mich., assignor to Eltra Corporation, Toledo, Ohio
Filed July 10, 1967, Ser. No. 652,062
Int. Cl. G10k 9/12; G08b 3/00; B60g 5/00
U.S. Cl. 340—390                                                    5 Claims

ABSTRACT OF THE DISCLOSURE

An electric horn with a base insulated from ground. The base is grounded only during horn operation by a manually operated switch, to obviate corrosion due to electrolysis under adverse ambient conditions.

---

In the past, horns on automotive vehicles have been mounted on brackets to the frame of the vehicle with small relays being used to close the electrical circuit from the battery through the horn electrical motor and thence to the ground through the mounting bracket back to the grounded negative terminal of the battery. When an operator wished to sound the horn as a warning, he would close the relay circuit to ground through the horn button on the steering wheel to cause the relay to close to activate the horn motor by applying electrical power from the battery thereto. To eliminate the relay in past horn applications and retain the same vehicle circuitry through the horn button to ground, the practice was to install a second terminal on the horn frame and isolate the added terminal from ground with sheet insulation. One of said terminals was connected directly to battery and the second terminal through the horn button to ground.

Due to the fact the horn frame, in this application, is normally grounded through the bracket and one terminal is connected directly to battery, a corrosion problem existed at this point when the horn was under salt water conditions. The fact that the normal 12 volt potential of the battery was continuously applied to the horn frame by the grounded bracket, caused the corrosion problems in the horn, particularly when the horn was subjected to adverse ambient conditions, such as salt spray from the streets in winter. The 12 volt potential was active across small clearances such as $1/16$ of an inch in the horn and caused electrical leakages which resulted in electrolysis at these points causing excessive corrosion and eventual destruction of the horns as an operating element of the automobile.

The present invention obviates this corrosive condition by isolating the horn frame from the ground and the only time the horn frame is grounded is the period in which the horn electrical circuit is closed by the operator pressing the horn button. Furthermore, the present invention allows a horn arrangement on the automobile which obviates the use of the horn relay, and provides an electrical circuit for the horn wherein the full horn operating current is carried by the horn button and the connecting wires, whereby considerable cost is removed for the purchaser of the horn assembly.

It is therefore a principal object of this invention to provide a horn mounting means which isolates the body of the horn from the electrical potential of the battery to obviate corrosive conditions due to electrolysis.

It is a further object of this invention to provide a cheaper horn installation by obviating the use of a horn relay.

Other objects and advantages of this invention relating to the arrangement, operation and function of the related elements of the structure, to various details of construction, to combinations of parts and to economies of manufacture will be apparent to those skilled in the art upon consideration of the following description and appended claim, reference being had to the accompanying drawings forming a part of this specification wherein like reference characters designate corresponding parts in the several views.

Referring to the drawings:
FIG. 1 is a side elevational view of a horn to which the invention has been applied, showing the electrical connections diagramatically.
FIG. 2 is a top plan view of FIG. 1.
FIG. 3 is a plan view of the mounting bracket detached from the horn body.
FIG. 4 is a side elevational view of the detached mounting bracket, and
FIG. 5 is a plan view of the terminal member cooperating with the bracket for completing the ground circuit for the horn.

Turning to the drawings, FIGURE 1 shows a horn to which my invention has been applied which has an internal construction and electrical elements very similar to that shown in my earlier Patent No. 3,242,483 assigned to the same assignee. A horn is shown having a base member 10, with an upwardly projecting boss 12 inside of which an electromagnetic motor 14 is mounted (shown in phantom) to vibrate a diaphragm 16 mounted against the flange 18 of the base member 10 to excite an air chamber formed in a projector member 20 to create an air note when operated. The base member 10 is provided with an insulated spade terminal 22 which is connected directly by wire 24 to the electrical energy source such as a battery B which has its negative terminal grounded as shown. The terminal 22 is an electrical circuit with the vibratory electrical motor 14 in a well known manner which electrical circuit through the motor is connected to the frame member 10 and also to attachment bolt 10A. This places the positive terminal of the battery in electrical circuit at all times with the base member 10 and the bolt 10A, whereas previously the negative terminal was connected to the base member to cause the resultant undesirable corrosion, particularly at the terminal 22.

The upper face 12A of the boss 12 is provided with small protrusions 12B preferably six in number, spaced equally about a central aperture into which is threaded the clamping bolt 10A, the bolt passing through aperture 10B in the end of a mounting bracket 30, which holds the horn in position in any suitable manner on the automobile. The protrusions 12B cooperate with indentations 30A in the bracket 30 to allow angular adjustments therebetween. The bolt 10A also has positioned under its hexagonal head, a second spade terminal member 32 shown in detail in FIG. 5 which has a central aperture 32A and makes electrical contact with the bolt and also with the frame member 10 of the horn. Flutings 32B are provided on the perimeter of the circular body to interlock with the indentations 30A to allow for angular adjustment for the terminal.

In order to insulate the horn body from the metal portion of the bracket 30, which normally is grounded to the metallic body of the automobile and therefore in electrical circuit with the grounded negative terminal of the battery B, an epoxy insulating coating 40 is applied to the end of the bracket 30 as shown. This epoxy coating covers all metal surfaces of the bracket end with a thick layer of insulating material which is polymerized in position by heat or the like. The coating is applied by means of a fluidized bed of the resin by dipping the heated end of the bracket therein or by a spraying process, both of which are known in the art. After polymerization, the coating is stone hard and very durable to atmospheric conditions and electrically isolates the horn body 10 from the bracket 30.

The projecting spade portion 32C of the terminal 32 is connected by wire 42 to horn button HB usually positioned on the steering wheel of the automobile within easy reach of the operator, so that when the button is depressed the wire 42 is grounded to complete the electrical circuit between the horn motor 14 and the battery B to cause the horn to sound. From this, it is clear that the horn body 10 is grounded only during the time period in which the horn button is depressed and the horn electrical circuit completed to thereby obviate the condition causing corrosion by electrolysis.

I claim:

1. In an electric horn for use on an automotive vehicle under adverse ambient conditions such as salt spray having an electromagnetic motor to drive a vibatory diaphragm energized by a source of direct-current energy such as a battery with the negative terminal grounded on the frame of the automotive vehicle and controlled by manually-operable switch, comprising in combination, a base member to mount said motor and diaphragm, a grounded mounting bracket on the automotive vehicle frame cooperating with the base member to mount the horn on the vehicle, an insulating body completely coating the mounting bracket end so as to be positioned between the grounded mounting bracket and the base member to isolate the base member from the grounded vehicle frame, a first terminal mounted with normal clearance in insulated relation on the base member to connect the positive terminal of the source of energy to the electromagnetic motor, a second terminal mounted on the base member in electrical contact therewith to connect the electromagnetic motor to one side of the manually-operable switch, and means to connect the other side of the switch to ground, whereby the base member is grounded only during the period in which the horn is operating to avoid excessive corrosion to the terminals by electrolysis.

2. The horn defined in claim 1 further characterized by affixing the mounting bracket and the second terminal to the base member by the same element.

3. The horn defined in claim 2 further characterized by the insulating body being an epoxy resin which is polymerized in position on the end of the mounting bracket.

4. The horn defined in claim 3 further characterized by having the epoxy insulating body positioned on the end of the mounting bracket by dipping.

5. The horn defined in claim 3 further characterized by having the epoxy insulating body positioned on the end of the mounting bracket by spraying.

References Cited

UNITED STATES PATENTS

| | | | |
|---|---|---|---|
| 1,853,709 | 4/1932 | Tibbetts | 340—390 |
| 1,441,872 | 1/1923 | Monnot et al. | 340—390 |
| 1,789,948 | 1/1931 | Scofield | 340—390 |

JOHN W. CALDWELL, Primary Examiner

H. I. PITTS, Assistant Examiner

U.S. Cl. X.R.

307—10, 95; 340—387, 391